United States Patent
Lee et al.

(10) Patent No.: US 7,991,944 B2
(45) Date of Patent: Aug. 2, 2011

(54) SYSTEM AND METHOD FOR SEARCHING MAPPING TABLE OF FLASH MEMORY

(75) Inventors: Byoung-Kook Lee, Suwon-si (KR); Jeong-Woo Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 604 days.

(21) Appl. No.: 12/026,837

(22) Filed: Feb. 6, 2008

(65) Prior Publication Data

US 2008/0195802 A1 Aug. 14, 2008

(30) Foreign Application Priority Data

Feb. 13, 2007 (KR) .................. 10-2007-0014740

(51) Int. Cl.
*G06F 12/00* (2006.01)
(52) U.S. Cl. ........................................ 711/103
(58) Field of Classification Search .................. None
See application file for complete search history.

(56) References Cited

U.S. PATENT DOCUMENTS

| | | | | |
|---|---|---|---|---|
| 5,813,031 A | * | 9/1998 | Chou et al. | 711/122 |
| 6,212,602 B1 | * | 4/2001 | Wicki et al. | 711/122 |
| 7,185,196 B1 | * | 2/2007 | Kuskin et al. | 713/162 |
| 7,191,306 B2 | * | 3/2007 | Myoung et al. | 711/203 |
| 7,610,438 B2 | * | 10/2009 | Lee et al. | 711/103 |
| 7,711,923 B2 | * | 5/2010 | Rogers et al. | 711/206 |
| 2004/0109376 A1 | * | 6/2004 | Lin | 365/230.03 |
| 2004/0186946 A1 | * | 9/2004 | Lee | 711/103 |
| 2005/0055532 A1 | * | 3/2005 | Yu | 711/203 |
| 2006/0031710 A1 | | 2/2006 | Jo | |
| 2006/0179212 A1 | | 8/2006 | Kim et al. | |
| 2007/0028039 A1 | * | 2/2007 | Gupta et al. | 711/108 |

FOREIGN PATENT DOCUMENTS

JP 2002-25281 1/2002

\* cited by examiner

*Primary Examiner* — Hiep T Nguyen
(74) *Attorney, Agent, or Firm* — F. Chau & Associates, LLC (57) ABSTRACT

A system and method for searching a mapping table of a flash memory is provided. The system includes at least one random access memory for storing the mapping table retrieved from the flash memory and at least one search engine for searching for data from the mapping table stored in the at least one random access memory using dedicated hardware. Thus, the search efficiency for the mapping table and system performance may be increased.

15 Claims, 7 Drawing Sheets

Start Address Register(SAR)

Hit Address Register(HAR)

Ending Address Register(EAR)

Matching Value Register(MVR)

Search Value Register(SVR)

Control Register(CR)

SYSTEM AND METHOD FOR SEARCHING MAPPING TABLE OF FLASH MEMORY

CROSS-REFERENCE TO RELATED APPLICATION

This application claims priority to Korean Patent Application No. 10-2007-0014740, filed Feb. 13, 2007, the disclosure of which is hereby incorporated by reference herein in its entirety.

BACKGROUND OF THE INVENTION

1. Technical Field

The present invention relates to flash memory and, more particularly, to a system and method for searching a mapping table of a flash memory.

2. Discussion of Related Art

A flash memory may be used as a random access memory (RAM) allowing for data writing and deleting. A flash memory may also be used as a read only memory (ROM) retaining data even when a power is not supplied. In modern portable devices such as digital cameras, personal digital assistants (PDAs), and MP3 players, flash memory is widely used in embedded systems, such as mobile systems, and the like.

Flash memory is considered nonvolatile because it can retain data even after power is disrupted. Unlike a hard disk, flash memory does not allow for the overwriting of existing data in particular sectors. Accordingly, it is necessary to perform an erase of a whole block of data before a write operation may be performed. In storing and accessing data, a logical address may be used to point to data in a logical block. Mapping algorithms may then be used to interpret the logical address and erase, write to and read from data located in physical blocks at physical addresses.

Figure 1:
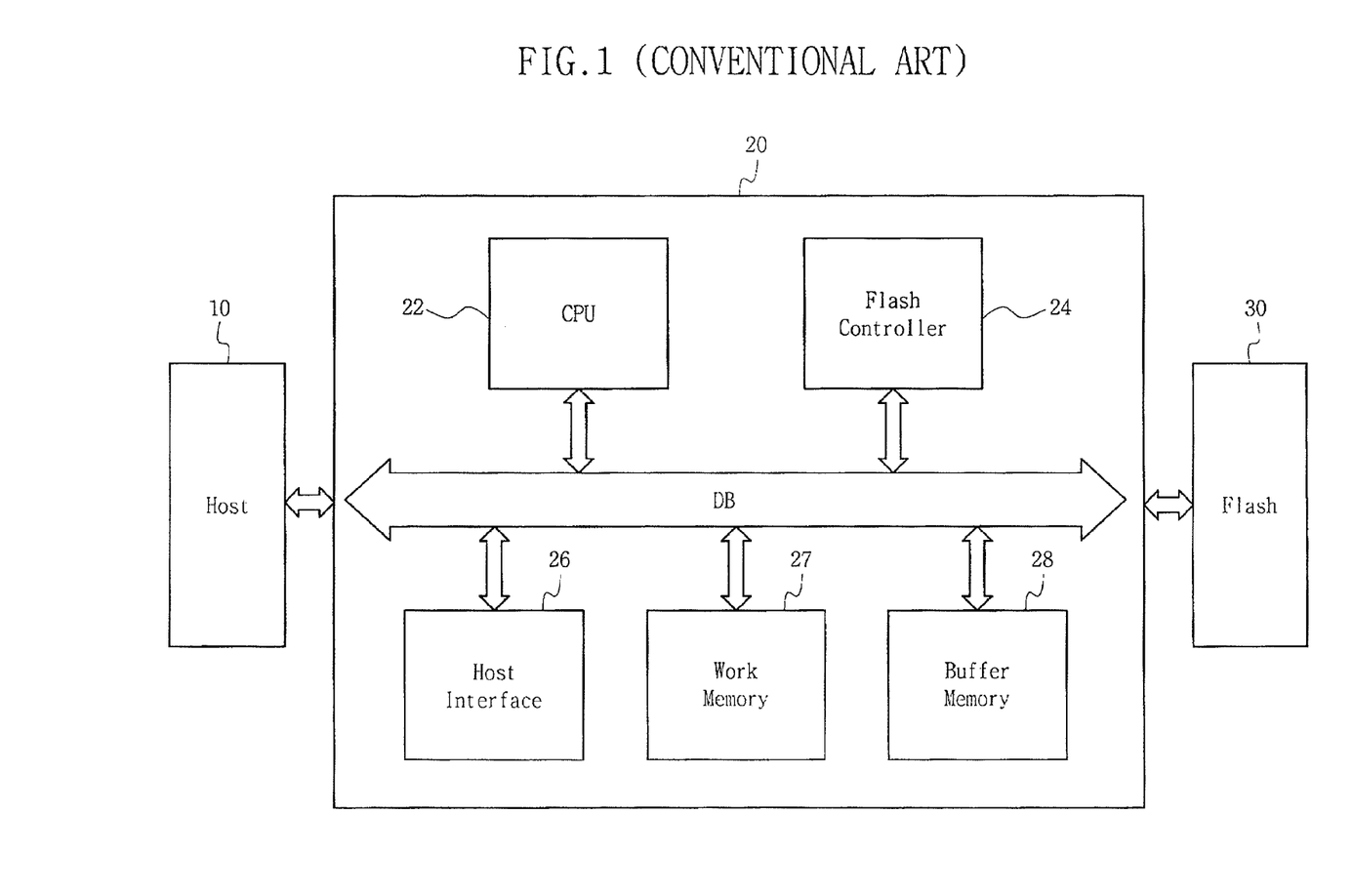
FIG. 1 is a block diagram illustrating a conventional system having a flash memory.

FIG. 1 is a block diagram illustrating a conventional system having a flash memory.

Referring to FIG. 1, a conventional system comprises an external host 10, a host interface 26, a flash memory 30 for storing data, a flash controller 24 for controlling operation of the flash memory, a CPU 22 for controlling general system operation, a work memory 27 as a main memory, and a buffer memory 28. The work memory 27 and the buffer memory 28 may comprise a dynamic random access memory (DRAM) or a static random access memory (SRAM).

In this conventional system, when the host 10 or the CPU 22 requests information from the flash memory, it must know the location of the data in the flash memory. Therefore, a mapping table exists. The mapping table may include a logical-to-physical mapping table, a page mapping table, a sector mapping table, a bad block mapping table, and the like of the flash memory.

The mapping table data is loaded and stored in the work memory 27 when a system is booted by the CPU 22 or the mapping table of the flash memory is changed. Accordingly, the host 10 or the CPU 22 recognizes an address of desired data by referring to the mapping table in order to fetch the data from the flash memory. The mapping table is searched by search software (S/W) residing in the work memory.

However, as the capacity of a flash memory increases, so too does the size and search time of the mapping table. System performance may therefore be degraded. In particular, as applications using high-capacity flash memories, such as flash memory cards or a solid state disks (SSDs), are developed, the mapping table search time is becoming an important issue.

SUMMARY OF THE INVENTION

An aspect of the present invention provides a system and method for searching a mapping table of a flash memory.

An aspect of the present invention provides a system and method for searching a mapping table of a flash memory which search a mapping table of a flash memory using hardware.

An aspect of the present invention provides a system and method for searching a mapping table of a flash memory which are capable of reducing mapping table search time even when a flash memory has high capacity.

An aspect of the present invention provides a system and method for searching a mapping table of a flash memory which are capable of increasing system performance.

An aspect of the present invention provides a system and method for searching a mapping table of a flash memory which are capable of increasing search efficiency.

Exemplary embodiments of the present invention provide a system for searching a mapping table of a flash memory. The system includes at least one random access memory for storing the mapping table loaded from the flash memory and at least one search engine for searching for data from the mapping table using hardware. The mapping table is stored in the at least one random access memory.

The system may further include a controller (e.g., a CPU) for loading the mapping table into the at least one random access memory and controlling the at least one search engine. Each of the at least one search engine may comprise a plurality of registers for storing addresses and control commands for the search engine which are input from the controller. The at least one search engine may receive a start address, an ending address, and a search value from the controller, search for a matching value corresponding to the search value in a range from the start address to the ending address, and output a hit address corresponding to the search value. The at least one search engine may further output the matching value corresponding to the search, as well as the hit address.

When the system uses two or more random access memories, the two or more random access memories may include a first random access memory having a relatively higher access and interface speed and a second random memory having a relatively lower access and interface speed than the first random access memory. The first random access memory may be a static random access memory (SRAM), and the second random access memory may be a dynamic random access memory (DRAM).

The controller may load first mapping table data having high importance, small size, or high search frequency into the first random access memory, and load second mapping table data having low importance, great size, or low search frequency into the second random access memory.

When the number of random access memories is two or more and two or more search engines correspond to the two or more random access memories, respectively, the two or more search engines may comprise a first search engine for searching for the first mapping table data from the first random access memory and a second search engine for searching for the second mapping table data from the second random access memory. The first search engine and the second search engine may be independent from each other in operation. The first mapping table data and the second mapping table data may be transferred via one common data bus and loaded into the first random access memory and the second random access memory, respectively. The first mapping table data may be transferred via a first fast data bus and loaded into the first random access memory, and the second mapping table data may be transferred via a second data bus slower than the first data bus and loaded into the second random access memory.

Exemplary embodiments of the present invention provide, in a system comprising a flash memory, a method for searching a mapping table of the flash memory. The method includes loading data of the mapping table of the flash memory into two types of random access memories, the random access memories differing in access and interface speed. An address range and a search value for searching for the mapping table data are inputted from the random access memories, to at least two search engines. The search engines are configured in hardware and are independent from each other in operation. A matching value corresponding to the search value from the mapping table data loaded in the random access memories are searched for using the search engines, and a hit address corresponding to the matching value is outputted.

The mapping table data may be divided according to importance, size and search frequency and separately loaded into the random access memories. Among the mapping table data, mapping table data having high importance, small size, or high search frequency may be loaded into a first random access memory having a relatively high access and interface speed. Mapping table data having low importance, great size, or low search frequency may be loaded into a second random access memory having relatively low access and interface speed.

The search engines may further include a first search engine for searching the first mapping table from the first random access memory and a second search engine for searching the mapping table from the second random access memory. The first search engine and the second search engine are independent from each other in operation.

Exemplary embodiments of the present invention provide, in a system including a flash memory, a method for searching a mapping table of the flash memory. The method includes searching the mapping table using at least one separate search engine.

The method may comprise dividing data of the mapping table according to importance, search frequency, and size. The divided data may be separately loaded into at least two random access memories. The mapping table data may be searched for from within the random access memories using at least two corresponding search engines.

With the above structure, search efficiency for the mapping table of the flash memory and system performance can be increased.

Exemplary embodiments of the present invention will now be described more fully hereinafter with reference to the accompanying drawings. This invention may, however, be embodied in many different forms and should not be construed as being limited to the embodiments set forth herein.

BRIEF DESCRIPTION OF THE DRAWINGS

The above and other features and aspects of the present invention will become more apparent to those of ordinary skill in the art from the following description of the exemplary embodiments, taken in conjunction with the accompanying drawings of which.

DETAILED DESCRIPTION OF EXEMPLARY EMBODIMENTS

Figure 2:
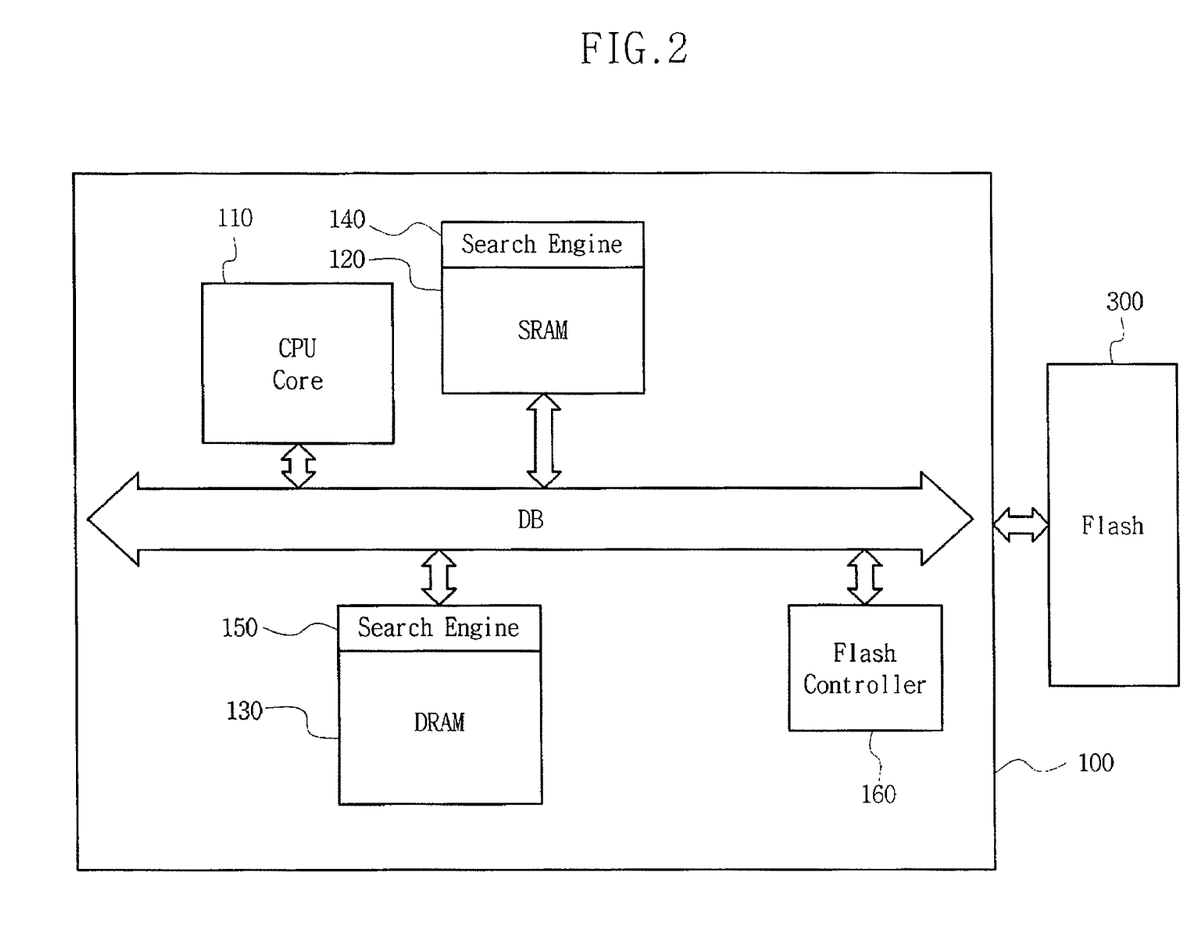
FIG. 2 is a block diagram illustrating a system for searching a mapping table according to an exemplary embodiment of the present invention.

Exemplary present invention will now be described more fully hereinafter with reference to the accompanying drawings. This invention may, however, be embodied in different forms and should not be construed as limited to the exemplary embodiments set forth herein. FIG. 2 is a block diagram illustrating a system 100 for searching a mapping table of a flash memory according to an exemplary embodiment of the present invention.

Referring to FIG. 2, the system 100 for searching a mapping table of the flash memory according to an exemplary embodiment of the present invention comprises one or more random access memories 120 and 130, and one or more search engines 140 and 150. The system 100 may further comprise a controller (e.g., central processing unit; CPU) 110 for controlling the random access memories 120 and 130 and the search engines 140 and 150. The system 100 comprises a flash memory 300 as a search object. The system 100 may further comprise a flash controller 160 for controlling the flash memory 300.

Each of the random access memories 120 and 130 comprises an SRAM or a DRAM into which a mapping table of the flash memory 300 is loaded. Each of the random access memories 120 and 130 may comprise either the SRAM or the DRAM so that the mapping table is loaded into the SRAM or the DRAM or may comprise one SRAM and one DRAM so that mapping table data are divided and loaded into the SRAM and the DRAM. The mapping table data is transferred via one common data bus (DB) and loaded into the random access memories 120 and 130.

When the system 100 comprises either the random access memory 120 or the random access memory 130, the mapping table of the flash memory 300 is loaded into the random access memory. When the system 100 comprises both the random access memories 120 and 130, the mapping table data can be divided and loaded into the random access memories 120 and 130.

When the system 100 comprises both the random access memories 120 and 130, the random access memory 120 may be a first random access memory (e.g., SRAM) having a relatively higher access and interface speed. The random access memory 130 may be a second random memory (e.g., DRAM) having a relatively slower access and interface speed than the first random access memory 120. A DRAM is primarily used as a main memory for a personal computer (PC) and a memory for a graphic card. Since the DRAM must be refreshed in a predetermined period to retain data, it has high power consumption; however, it may also have a higher operation speed than a flash memory and a higher integration than an SRAM. Accordingly, DRAMs are widely used, forming the largest market among memories.

An SRAM is the earliest developed memory and is generally known as being faster than a DRAM. SRAMs are classified into low-power SRAMs and high-speed SRAMs depending on speed and power consumption. The low-power SRAM is somewhat slow in operation but consumes less power in a standby mode where a device employing the low-power SRAM does not operate. Accordingly, the low-power SRAM is widely used as a main memory of a mobile device. The high-speed SRAM is used as a main memory for high-speed middle and large scale computers (e.g., super computers).

The search engines 140 and 150 search for data from the mapping table, which is loaded into the random access memories 120 and 130, using hardware. The search engines 140 and 150 are configured in hardware, rather than software. The search engines 140 and 150 correspond to the random access memories 120 and 130, respectively.

Specifically, when the system 100 comprises one of the random access memories 120 and 130, the system 100 comprises only one of the search engines 140 and 150. When the system 100 comprises both the random access memories 120 and 130, the system 100 may comprise both the search engines 140 and 150. The system 100 may comprise one of the search engines 140 and 150 for searching for data from the two random access memories 120 and 130.

The search engine may be divided into a first search engine 140 for searching for the mapping table data loaded into the first random access memory 120, and a second search engine 150 for searching for the mapping table data loaded into the second random access memory 130. The operation and structure of the search engines 140 and 150 will be described below with reference to FIGS. 3 and 4.

The controller 110 loads the mapping table to the random access memories 120 and 130 and controls the search engines 140 and 150. The controller 110 controls general operation of the random access memories 120 and 130 and the search engines 140 and 150, and also controls the whole system 100. In particular, the controller 110 provides a start address, an ending address, a search value, and the like to the search engines 140 and 150, so that the search engines 140 and 150 perform searching operation.

The flash controller 160 controls the flash memory 300 under control of the controller 110 or independently.

Figure 3:
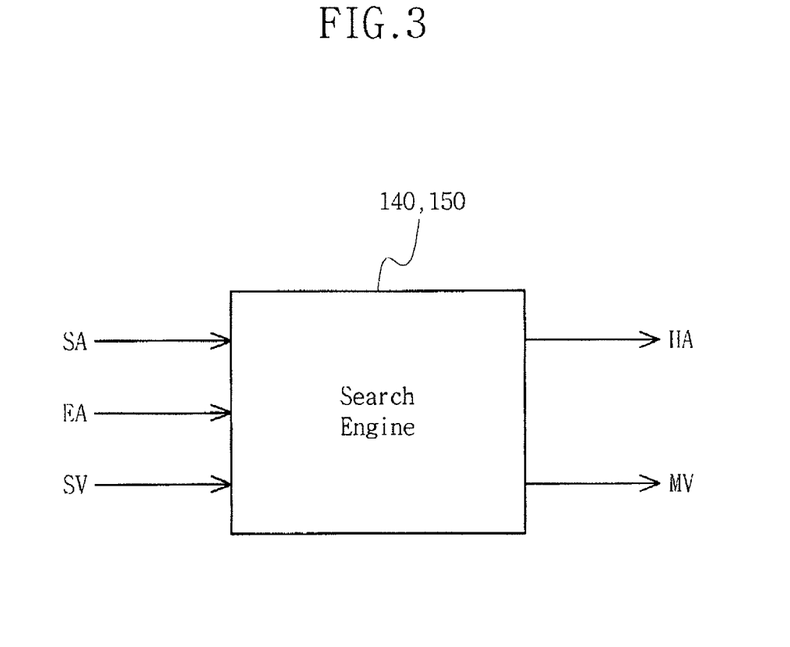
FIG. 3 is a block diagram illustrating a search engine of FIG. 2.

FIG. 3 is a block diagram illustrating the search engine 140 or 150 of FIG. 2.

Referring to FIG. 3, the search engine 140 or 150 comprises a plurality of registers for storing addresses SA and EA and control commands for the search engine 140 or 150 that are input from the controller 110. The search engine 140 or 150 is configured in hardware.

In response to the start address SA, the ending address EA, and a search value SV from the controller, the search engine 140 or 150 searches for the search value SV in a range from the start address SA to the ending address EA, and outputs a hit address HA corresponding to a matching value MV that is searched for. Here, the search engine 140 or 150 may output the hit address HA and the searched matching value MV.

The start address SA refers to an address from which searching starts, and the ending address EA refers to an address at which searching ends. The search value SV refers to a value of data to be searched, the hit address HA refers to an address where the matching value MV is stored, and the matching value MV refers to a data value matched with the search value SV.

Figure 4:
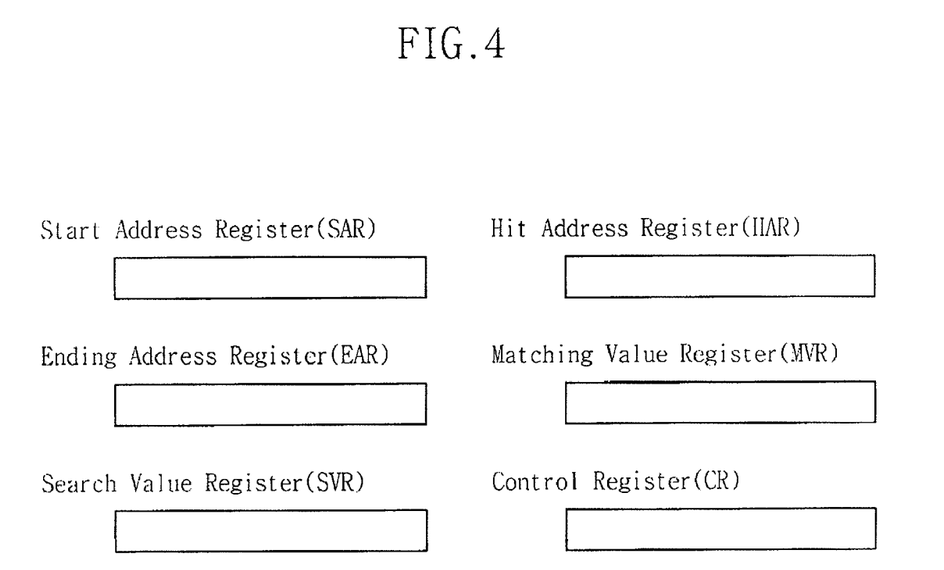
FIG. 4 illustrating an example of registers of the search engine of FIG. 3.

FIG. 4 illustrates the registers of the search engine in FIG. 3.

As shown in FIG. 4, the search engine 140 or 150 may comprise a start address register SAR for storing the start address SA, an ending address register EAR for storing the ending address EA, a search value register SVR for storing the search value SV, a hit address register HAR for storing the hit address HA, a matching value register MVR for storing the matching value MV, and a control register CR for storing control related data, such as a control command for the search engine.

Figure 5:
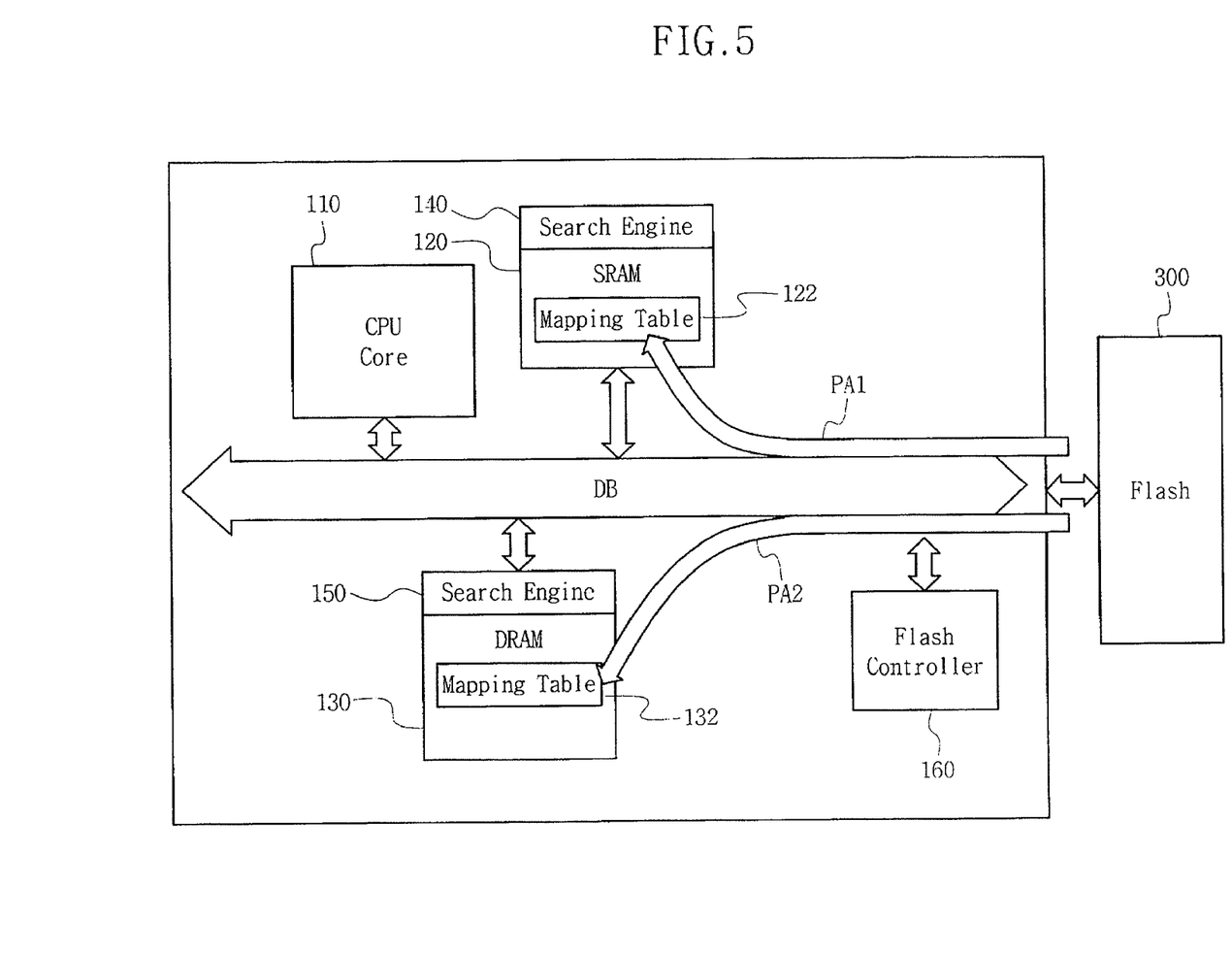
FIG. 5 is a block diagram illustrating operation of loading mapping tables in the system shown in FIG. 2.
Figure 6:
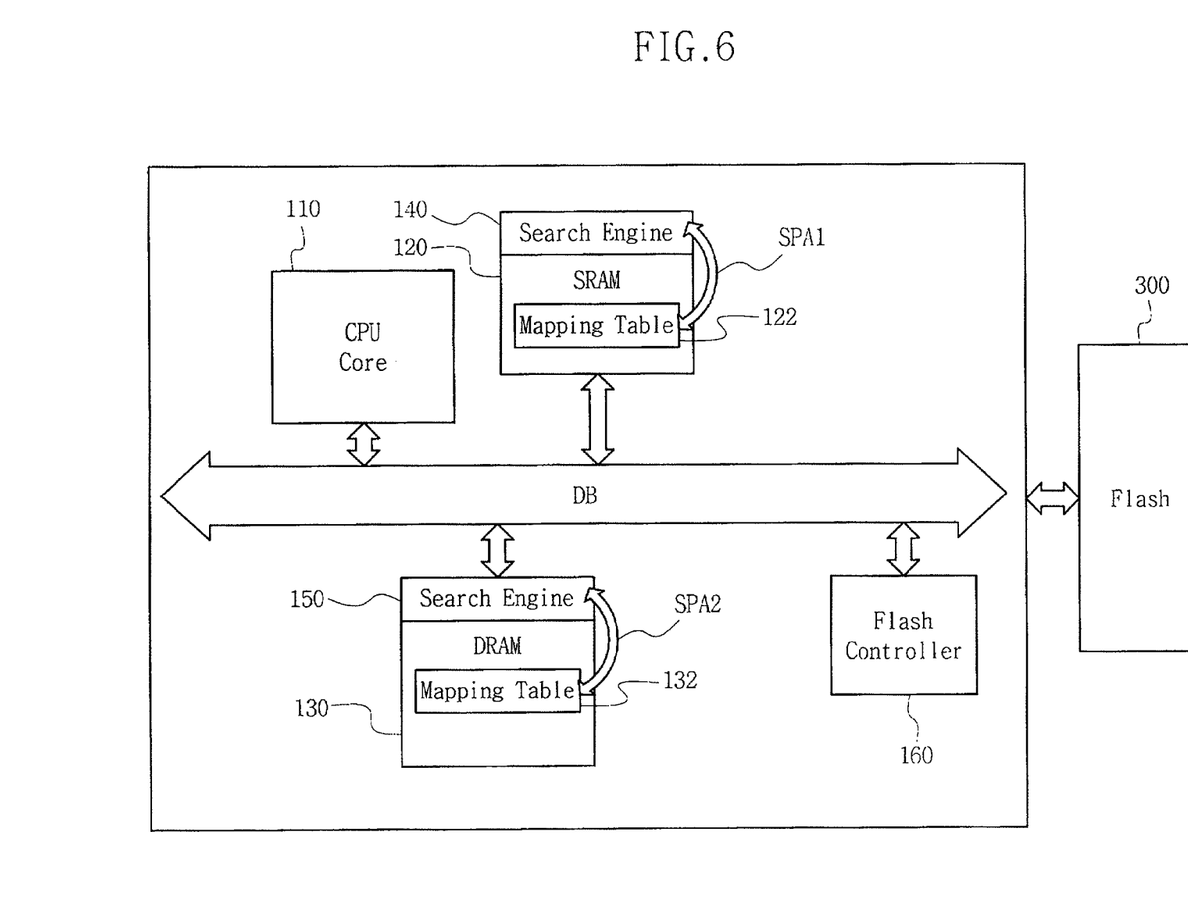
FIG. 6 is a block diagram illustrating searching operation in the system shown in FIG. 2.

FIGS. 5 and 6 are block diagrams illustrating operation of loading the mapping tables 122 and 132 into the random access memories 120 and 130 and operation for searching after the loading operation in the system shown in FIG. 2.

As shown in FIG. 5, a portion of the mapping table stored in the flash memory 300 is loaded into the first random access memory 120 via one common data bus DB, and the remaining portion is loaded into the second random access memory 130.

As shown in FIG. 6, the mapping table data 122 loaded into the first random access memory 120 is searched for by the first search engine 140 via a first search pass SPA1, and the mapping table data 132 loaded into the second random access memory 130 is searched for by the second search engine 150 via a second search pass SPA2.

As described above, as the mapping table is searched using the hardware, overhead incurred by use of software can be reduced and the search speed for the mapping table can increase.

As the capacity of a flash memory is increased, the size of a mapping table may increase. In particular, in the case of a data block mapping table, as the capacity of a flash memory increases, the size of a mapping table may increase accordingly. In recent years, hard disks have been replaced with flash memory. Increase in the search time incurred by the increasing capacity of the flash memory affects system performance. In the system shown in FIGS. 2 to 6, the mapping table is searched using the hardware, for example, the search engines 140 and 150, thereby reducing the search time. In order to further reduce the search time, searching can be performed at a high speed using independent search engines by dividing the data block mapping table or the entire mapping table into two portions and loading the two portions into the first random access memory 120 and the second random access memory 130, respectively. For example, the mapping table data may be divided into mapping table data for fast response or of a relatively smaller size and mapping table data for low response or of a relatively greater size, and loaded. This will be described with reference to FIG. 7.

Figure 7:
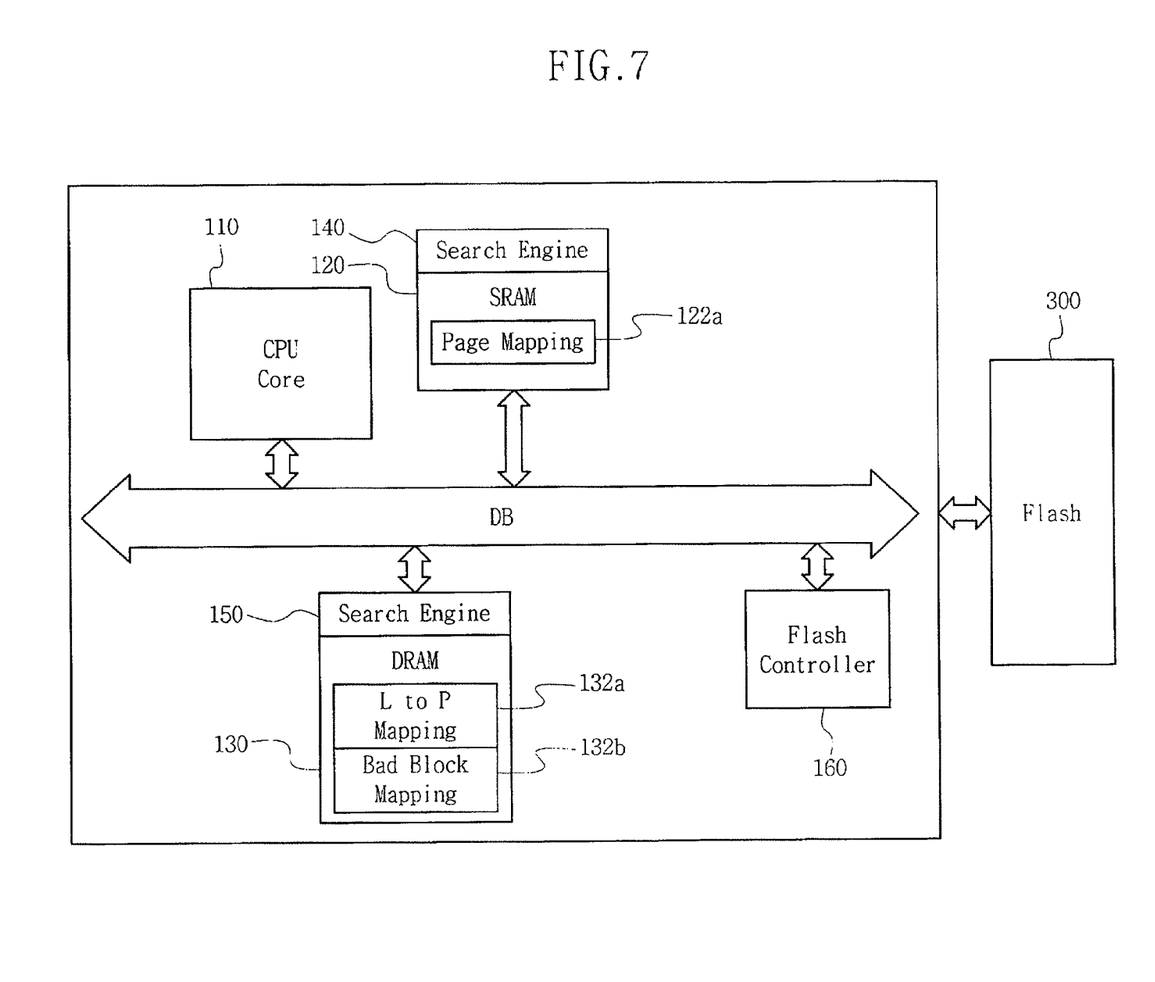
FIG. 7 is a block diagram illustrating an example of dividing and loading mapping table data according to importance, size, and search frequency.

FIG. 7 is a block diagram illustrating an example of dividing and loading mapping table data according to importance, size, and search frequency.

As shown in FIG. 7, first mapping table data, e.g., page mapping table data 122a, having higher importance, smaller size, or higher search frequency among the entire mapping table data may be loaded into the first random access memory 120.

second mapping table data, e.g., bad-block mapping table data 132b and logical-to-physical mapping table data 132a, having lower importance, greater size, or lower search frequency may be loaded into the second random access memory 130. Loading the first mapping table data into the first random access memory 120 and loading the second mapping table data into the second random access memory 130 may be performed under control of the controller 110.

The first mapping table data 122a is searched for by the first search engine 140 and the second mapping table data 132a and 132b are searched for by the second search engine. This parallel hardware search shortens search time and increases overall performance of the system.

Figure 8:
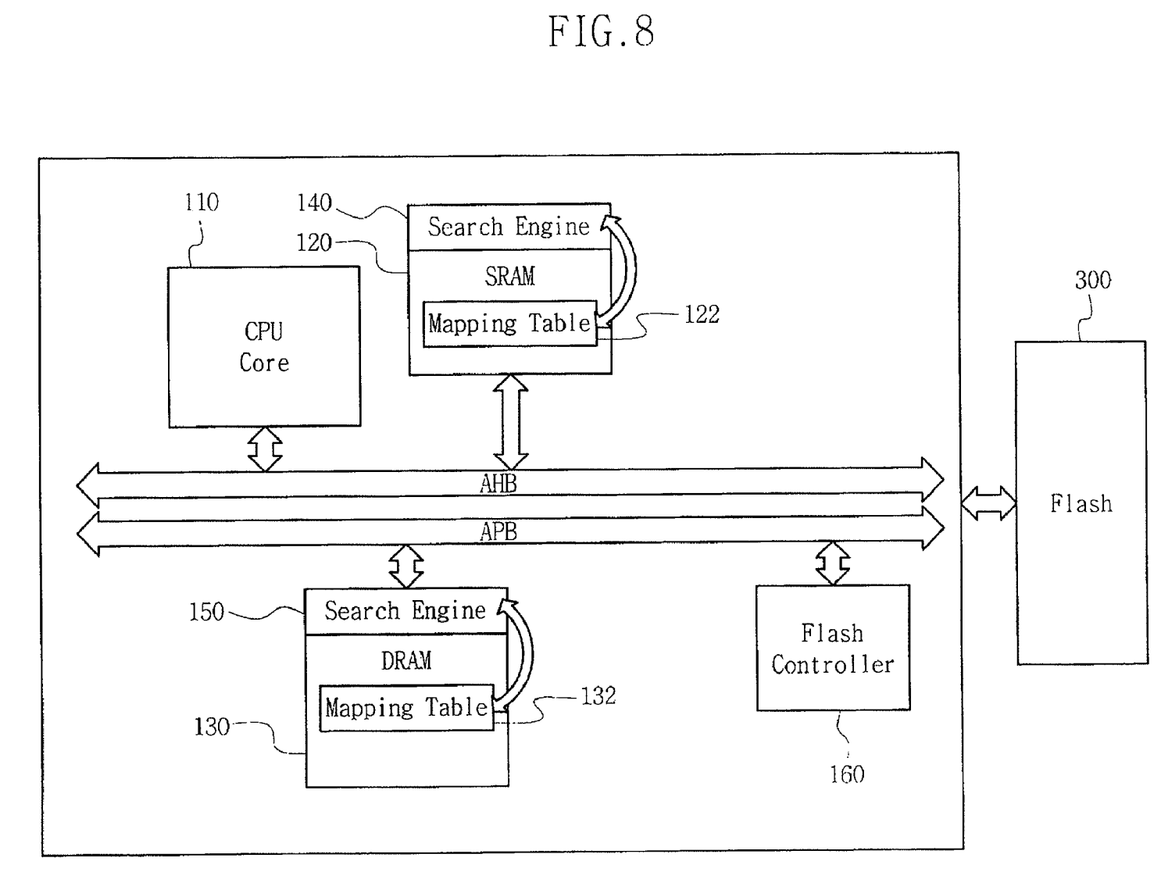
FIG. 8 is a block diagram illustrating a system for searching a mapping table according to an exemplary embodiment of the present invention.

FIG. 8 is a block diagram illustrating a system for searching a mapping table according to an exemplary embodiment of the present invention. Here, the system comprises two data buses, unlike the system for searching a mapping table shown in FIGS. 2 to 7.

Referring to FIG. 8, the system for searching a mapping table according to an exemplary embodiment of the present invention comprises two data buses AHB and APB for transferring the mapping table data.

Among the two data buses AHB and APB, the first data bus AHB is for high-speed transmission, and the second data bus APB is for low-speed transmission.

The first mapping table data 122a is transferred via the first data bus AHB and loaded into the first random access memory 120, and the second mapping table data 132a and 132b are transferred via the second data bus APB, which is slower than the first data bus AHB, and loaded into the second random access memory 130.

Other portions and their operation may be similar to those illustrated in FIG. 2 to 7 and described above.

As the mapping table is searched using the hardware, overhead incurred by use of software can be reduced and the search speed for the mapping table can increase. As the mapping table data are divided into two portions and loaded, parallel hardware search is possible. Thus, the search time can be shortened and overall performance of the system can be increased.

As described above, as the mapping table is searched using the hardware, overhead incurred by use of software can be reduced, the search speed for the mapping table can increase, and search efficiency can be increased. As the mapping table data are divided into two portions and loaded, parallel hardware search is possible. Thus, the search time can be shortened and overall performance of the system can be increased.

Exemplary embodiments of the present invention have been described, however, is to be understood that the scope of the invention is not limited to the disclosed exemplary embodiments.

What is claimed is:

1. A flash memory system for interfacing a host device to a flash memory, comprising:
at least one random access memory for storing a mapping table mapping logical memory addresses of the flash memory to physical memory addresses of the flash memory, the mapping table retrieved from the flash memory; and
at least one dedicated hardware-based search engine, which is distinct from a memory controller, associated with each of the at least one random access memories for searching for desired physical memory addresses of the flash memory from the mapping table stored in the random access memory, wherein the dedicated hardware-based search engine comprises:
a start address register for storing a start address from which searching starts;
an ending address register for storing an ending address from which searching ends;
a search value register for storing a value of a logical address to be searched for;
a hit address register for storing a physical address corresponding to the logical address to be searched for; and
a control register for storing a control command for the dedicated hardware-based search engine.

2. The system according to claim 1, further comprising a controller for loading the mapping table into the at least one random access memory and controlling the at least one search engine.

3. The system according to claim 2, wherein there are two or more random access memories including:
a first random access memory having a relatively higher access and interface speed; and
a second random access memory having a relatively lower access and interface speed than the first random access memory.

4. The system according to claim 3, wherein the first random access memory is a static random access memory (SRAM), and the second random access memory is a dynamic random access memory (DRAM).

5. The system according to claim 3, wherein the controller loads first mapping table data having high importance, small size, or high search frequency into the first random access memory, and loads second mapping table data having low importance, great size, or low search frequency into the second random access memory.

6. The system according to claim 2, wherein each of the two or more search engines operate independently of each other.

7. The system according to claim 5, wherein the first mapping table data and the second mapping table data are transferred via a common data bus and are retrieved into the first random access memory and the second random access memory, respectively.

8. The system according to claim 5, wherein the first mapping table data is transferred via a first data bus and retrieved into the first random access memory, and the second mapping table data is transferred via a second data bus slower than the first data bus and retrieved into the second random access memory.

9. A method for searching a mapping table mapping logical memory addresses of a flash memory to physical memory addresses of the flash memory, the method comprising:
loading data of the mapping table of the flash memory into a first and second random access memory, the first and second random access memories differing in access and interface speed;
inputting an address range and a logical address of the flash memory to at least a first and second dedicated hardware-based search engine, distinct from a memory controller, associated with each of the first and second random access memory, the first and second search engines being independent from each other; and
searching for a physical address corresponding to the logical address from the mapping table data retrieved in the first and second random access memories using the first and second dedicated hardware-based search engines, and outputting a hit address corresponding to the physical address.

10. The method according to claim 9, wherein the mapping table data are divided according to importance, size and search frequency and separately retrieved into the first and second random access memories.

11. The method according to claim 10, wherein data of the mapping table data having high importance, small size, or high search frequency is retrieved into the first random access memory, and data of the mapping table data having low importance, great size, or low search frequency is retrieved into the second random access memory, wherein the first random access memory has a higher access speed and interface speed than the second random access memory.

12. The method according to claim 11, wherein the first random access memory is an SRAM, and the second random access memory is a DRAM.

13. The method according to claim 11, wherein:
the first search engine searches the mapping table data from the first random access memory; and
the second search engine searches the mapping table data rom the second random access memory, wherein the first search engine and the second search engine operate independently of each other.

14. A method for searching a mapping table of a flash memory, the mapping table mapping logical memory addresses of the flash memory to physical memory addresses of the flash memory, the method comprising searching the mapping table using at least one dedicated hardware-based search engine, distinct from a memory controller, the dedicated hardware-based search engine comprising:

a start address register for storing a start address from which searching starts;
an ending address register for storing an ending address from which searching ends;
a search value register for storing a value of a logical address to be searched for;
a hit address register for storing a physical address corresponding to the logical address to be searched for; and
a control register for storing a control command for the dedicated hardware-based search engine.

15. The method according to claim 14, comprising dividing data of the mapping table according to importance, search frequency, and size; separately loading the divided data into at least two random access memories; and searching for the mapping table data from the random access memories using at least two corresponding search engines of the at least one search engine.

* * * * *